(12) United States Patent
Winer et al.

(10) Patent No.: US 8,519,937 B2
(45) Date of Patent: Aug. 27, 2013

(54) DIGITALLY MODULATED IMAGE PROJECTION SYSTEM

(75) Inventors: Paul Winer, Santa Clara, CA (US); Achintya K. Bhowmik, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 2667 days.

(21) Appl. No.: 11/096,682

(22) Filed: Mar. 31, 2005

(65) Prior Publication Data

US 2006/0221020 A1 Oct. 5, 2006

(51) Int. Cl.
*G09G 3/36* (2006.01)
(52) U.S. Cl.
USPC ............. 345/102; 345/98; 345/207; 345/691
(58) Field of Classification Search
USPC ............... 345/102, 55, 87, 204, 690, 98, 207, 345/691
See application file for complete search history.

(56) References Cited

U.S. PATENT DOCUMENTS

| 5,461,410 | A | * | 10/1995 | Venkateswar et al. | ........ 347/240 |
| 6,857,751 | B2 | * | 2/2005 | Penn et al. | ....................... 353/97 |
| 7,226,172 | B2 | * | 6/2007 | Robinson | ........................ 353/97 |
| 2005/0162725 | A1 | * | 7/2005 | Childers | ....................... 359/237 |

OTHER PUBLICATIONS

U.S. Appl. No. 11/014,928, filed Dec. 17, 2004, Cynthia S. Bell et al., *Illumination Modulation Technique*.
U.S. Appl. No. 11/014,929, filed Dec. 17, 2004, Paul Winer et al., *Illumination Modulation Technique*.

* cited by examiner

*Primary Examiner* — William Boddie
*Assistant Examiner* — Leonid Shapiro
(74) *Attorney, Agent, or Firm* — Trop, Pruner & Hu, P.C.

(57) ABSTRACT

A projection display may include a spatial light modulator that receives light from a light source via an analog modulator. The analog modulator may be a liquid crystal device. The bit depth may be increased by modulating the light from the lamp, for example to account for different pixel luminance levels.

30 Claims, 8 Drawing Sheets

DIGITALLY MODULATED IMAGE PROJECTION SYSTEM

BACKGROUND

The invention generally relates to projection display systems using spatial light modulators.

A projection display system typically includes one or more spatial light modulators (SLMs) that modulate light for purposes of producing a projected image. The SLM may include, for example, a liquid crystal display (LCD) such as a high temperature polysilicon (HTPS) LCD panel or a liquid crystal on silicon (LCOS) microdisplay, a grating light valve or a MEMs (where "MEMs" stands for micro-electro-mechanical devices) light modulator such as a digital micromirror display (DMD) to modulate light that originates from a lamp of the projection display system. In typical projection display systems, the lamp output is formatted with optics to deliver a uniform illumination level on the surface of the SLM. The SLM forms a pictorial image by modulating the illumination into spatially distinct tones ranging from dark to bright based on supplied video data. Additional optics then relay and magnify the modulated illumination pattern onto a screen for viewing.

The SLM typically includes an array of pixel cells, each of which is electrically controllable to establish the intensity of a pixel of the projected image. In some projection display systems, SLMs are transmissive and in others, they are reflective. For the purposes of simplification, the discussion will address reflective SLMs. An SLM may be operated so that each pixel has only two states: a default reflective state which causes either a bright or a dark projected pixel and a non-default reflective state which causes the opposite projected pixel intensity. In the case of an LCOS SLM, the pre-alignment orientation of the LC material and any polarizers in the system determine whether the default reflective state is normally bright or normally dark. For the purposes of simplification, the discussion will denote the default reflective state as normally bright, i.e., one in which the pixel cell reflects incident light into the projection lens (the light that forms the projected image) to form a corresponding bright pixel of the projected image. Thus, in its basic operation, the pixel cell may be digitally-controlled to form either a dark pixel (in its non-default reflective state) or a bright pixel (in its default reflective state). In the case of a DLP SLM, the states may represent the pixel in a co-planar position to the underlying substrate.

Although its pixels are operated digitally, the above-described SLM may also be used in an application to produce visually perceived pixel intensities (called "gray scale intensities") between the dark and bright levels. For such an application, each pixel may be controlled by pulse width modulation (PWM), a control scheme that causes the human eye to perceive gray scale intensities in the projected image, although each pixel cell still only assumes one of two states at any one time. The human visual system perceives a temporal average of pixel intensity when the PWM control operates at sufficiently fast rates.

In the PWM control scheme, a pixel intensity (or tone) is established by controlling the time that the pixel cell stays in its reflective state and the time that the pixel cell remains in the non-reflective state during an interval time called a PWM cycle. This type of control is also referred to as duty cycle control in that the duty cycle (the ratio of the time that the pixel cell is in its reflective state to the total time the pixel cell is in its non-reflective and reflective states) of each PWM cycle is controlled to set the pixel intensity. A relatively bright pixel intensity is created by having the pixel cell spend a predominant proportion of time in its reflective state during the PWM cycle, while a relatively dark pixel intensity is created by having the pixel cell spend a predominant amount of time in its non-reflective state during the PWM cycle.

The quality of the projected image typically is a function of the number of possible gray scale intensities, also called the "bit depth." For the above-described PWM control scheme, a bit depth of "N" means that the PWM cycle is divided into $2^N$ time consecutive and non-overlapping time segments. For a particular PWM cycle, each of the time segments in which the pixel cell is in its reflective state contributes to the overall luminance of the corresponding pixel. Each time segment of the PWM cycle typically corresponds in duration to the cycle of a clock signal. Thus, the larger the number of time segments (i.e., the greater the number of gray scale intensities), the higher the frequency of this clock signal, thereby requiring a high speed clock to form the pixel gray scale or tonal range. Power consumption is also a function of this clock frequency and also increases with bit depth.

Other factors may increase the clock rate needed for a particular bit depth. For example, for a three SLM LCD panel projection system (one SLM for each primary color), the PWM cycle may have a period that is equal to one half of the video data's field rate. The field rate is the rate at which a complete image, such as a frame, is displayed (typically 1/60 second). Opposite drive voltage polarities are needed in LCD systems to prevent voltage bias accumulation. This is well known for liquid crystal display systems. Thus, LCD SLM devices may use two PWM cycles in each video data field. This doubles the clock rate requirement.

For a two SLM panel projection system where one of the SLM panels is temporally shared by two primary colors, the video frame time may be split to allocate PWM cycles to each primary color, thereby increasing the needed PWM clock rate if the same bit depth is maintained in all colors.

For a one SLM panel projection system with an SLM panel temporally shared by all three primary colors, the video frame time may be further subdivided. For an LCOS SLM the video frame time may be divided into six PWM cycles, a pair for each primary color. The PWM clock period may have an even shorter duration when the unequal length PWM cycles are needed to adjust the display white point. Since common projection lamps are rich in blue and weak in red output, it is generally necessary to devote longer portions of the video frame time to red to achieve white balance. This necessitates the PWM clock period to be increasingly small and the clock frequency and power consumption to be increasingly high.

DETAILED DESCRIPTION

Figure 1:
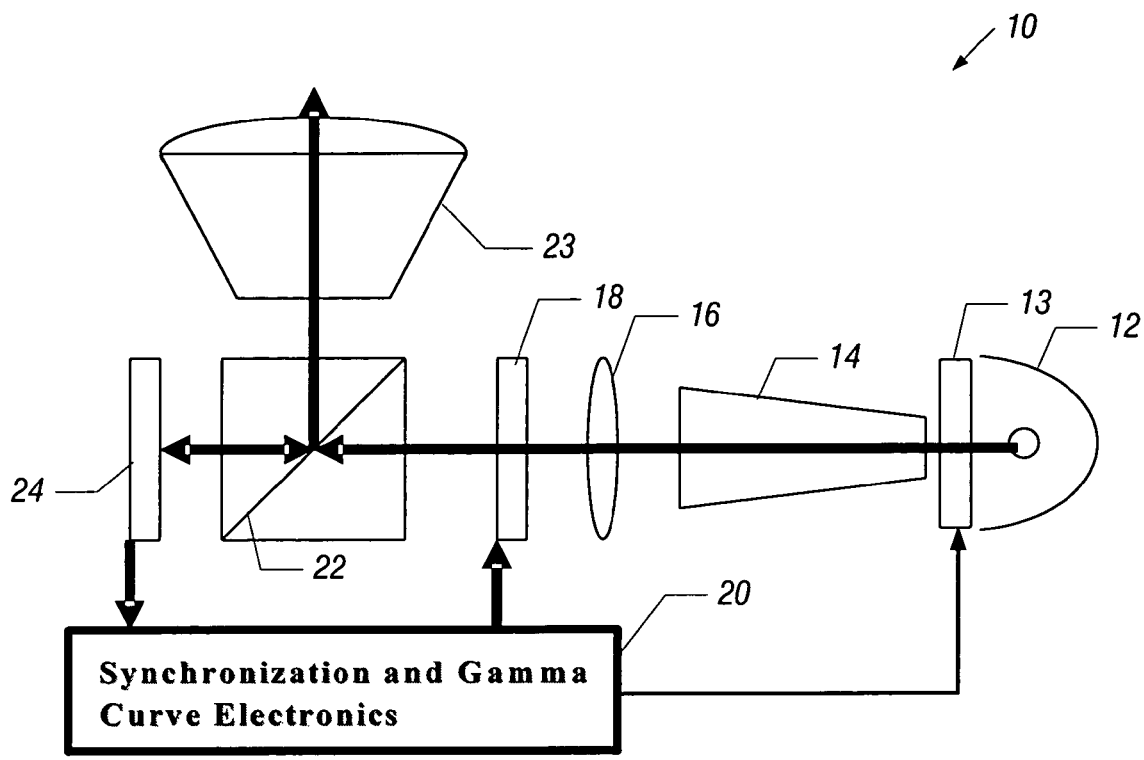
FIG. 1 is a schematic diagram of a projection display system according to an embodiment of the invention.

Referring to FIG. 1, a projection display system 10 in accordance with an embodiment of the invention includes one or more spatial light modulators (SLMs) 24 (one shown in FIG. 1) that modulate impinging light to produce a projected composite, color optical image (herein called "the projected image"). The SLM 24 may be a liquid crystal (LC) SLM or a MEMs-type SLM, depending on the particular embodiment of the invention.

Unless otherwise stated, embodiments described herein use LC SLMs for purposes of simplifying the description. However, it is understood that other SLMs, such as grating light valve, HTPS, or other technology SLMs, may be used, in other embodiments of the invention. Furthermore, unless otherwise noted below, the projection display system 10 includes a single SLM 24, for purposes of simplifying the following description, although other projection systems that have multiple SLMs may be alternatively used and are within the scope of the appended claims.

In accordance with some embodiments of the invention, the projection display system 10 includes a lamp assembly 12 (a mercury lamp and reflector, for example) that produces a broad visible spectrum illumination beam. That beam passes through an ultraviolet/infrared (UV/IR) filter (not shown) of the system 10.

As previously stated, the single-SLM configuration that is depicted in FIG. 1 is for purposes of example only. Thus, the projection display system 10 may be replaced by another projection display system, in other embodiments of the invention, such as a projection display system that includes three SLMs, one for each primary color (red, green and blue, for example) of the projected image. As another example, in some embodiments of the invention, red, green and blue light may be temporally shared on an SLM in a two SLM display projection system. Therefore, many variations are possible and are within the scope of the appended claims.

Referring to FIG. 1, among its other components, the projection display system 10 includes homogenizing and beam shaping optics 14, 16 that further shape and collimate the light that exits the light source 12, prepolarizes and directs the resultant beam to the polarizing beam splitter 22. The polarizing beam splitter (PBS) 22 separates the light from the light source 12 based on polarization. Once modulated by the SLM 24, the polarizing beam splitter 22 directs the modulated beam through projection lenses 23 for purposes of forming the projected image. For single or dual-panel field-sequential systems, where one SLM receives and modulates more than one color in a time sequential format, a rotating color filter wheel 13 or an LC-based voltage-tunable color filter is used.

Depending on the particular embodiment of the invention, the SLM 24 may be a digital mirror device (DMD), liquid crystal display (LCD) device, or other pixelated SLM. In some embodiments of the invention, the SLM 24 is a liquid crystal on silicon (LCOS) device that includes a liquid crystal layer that is formed on a silicon substrate in which circuitry (decoders, control circuits and registers, for example) to control and operate the device is fabricated.

Figure 2:
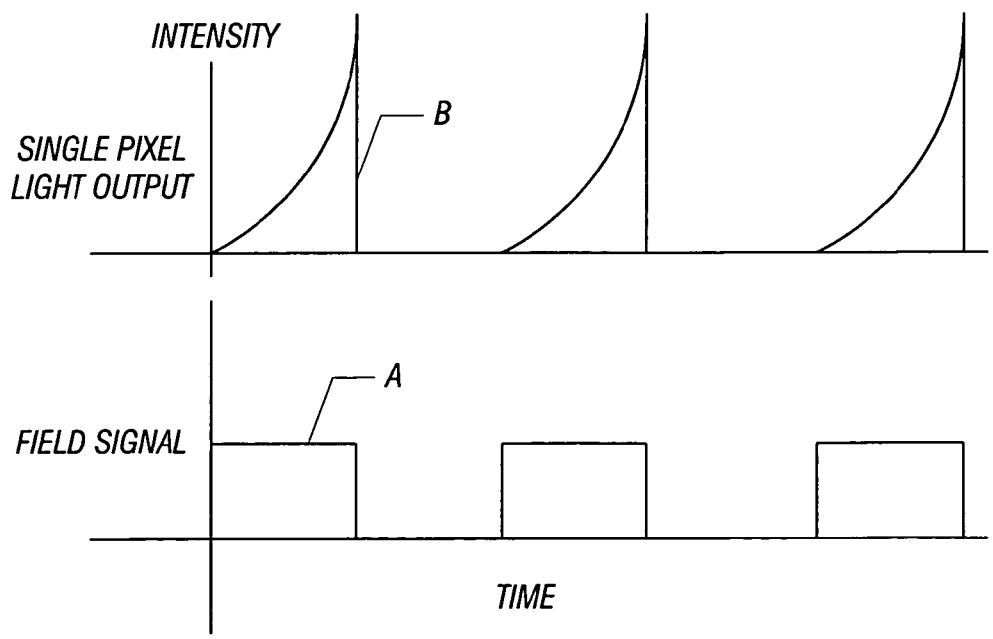
FIG. 2 is a timing diagram for one embodiment of the present invention.

Referring to FIG. 1, a single pixel analog light modulator 18 may modulate the output from the lamp 12. Since the modulator 18 is between the lamp 12 and the SLM 22, it can uniformly modulate the light from the lamp 12 in the time domain, providing a repetitive exponential intensity, synchronized with the field rate, as shown in FIG. 2. Namely, at the timing indicated by the pulses A at the field rate of a particular system 10, an exponential intensity pulse B may be generated. The pulse generation and synchronization may be handled by the synchronization and gamma curve electronics 20 (FIG. 1). Those electronics 20 include a repetitive non-linear or exponential signal generator to generate the exponential pulse.

In one embodiment, the modulator 18 may be a liquid crystal device that includes a thin layer of appropriate liquid crystal molecules placed between two polarizers coated with transparent electrodes such as indium tin oxide. Optical transmission may be controlled via the applied voltage across the liquid crystal device.

The speed of the analog modulator 18 is matched to the field rate of the display system 10. The combination of an analog exponential light intensity modulation and the linear microdisplay 24 intensity modulation may provide an accurate intensity transfer function for the video display system 10.

In some embodiments, the modulator 18 may also provide global functions such as color balance, enhanced contrast, and overall brightness control. The transmission of the single pixel modulator 18 can be lowered when dark video scenes are imaged by the microdisplay, which will enhance the perceived contrast of the display system in some embodiments. In addition, the electrical performance requirements of the microdisplay 24 may be reduced. By reducing the bit depth, the required clock speed of the system 10 and circuit complexity can be reduced in some embodiments. This improves yield margin and reduces power consumption in some cases.

For example, in connection with LCOS display systems, power consumption is critical because the liquid crystal is in intimate contact with the die and must be operated at temperatures below 80° C. and, most typically, 40 to 60° C. Ultimately then, reducing bit depth in this way may improve the reliability, aid the thermomechanical design of the package, and hence reduce the cost of the microdisplay. By implementing the gamma correction in the analog domain, the transfer function may be more suitably accomplished, while the spatial light modulation required for image formation may be implemented in the digital domain using the SLM device which provides superior image quality in some embodiments.

Thus, as shown in FIG. 2, the single pixel light modulator 18 output pulses B exponentially increase in synchronism with the field rate of the display, whatever it may be. In other words, each time the SLM 24 produces a complete image, such as a frame, in the same sequence, the gamma correction may be applied by the analog modulator 18.

Figure 3:
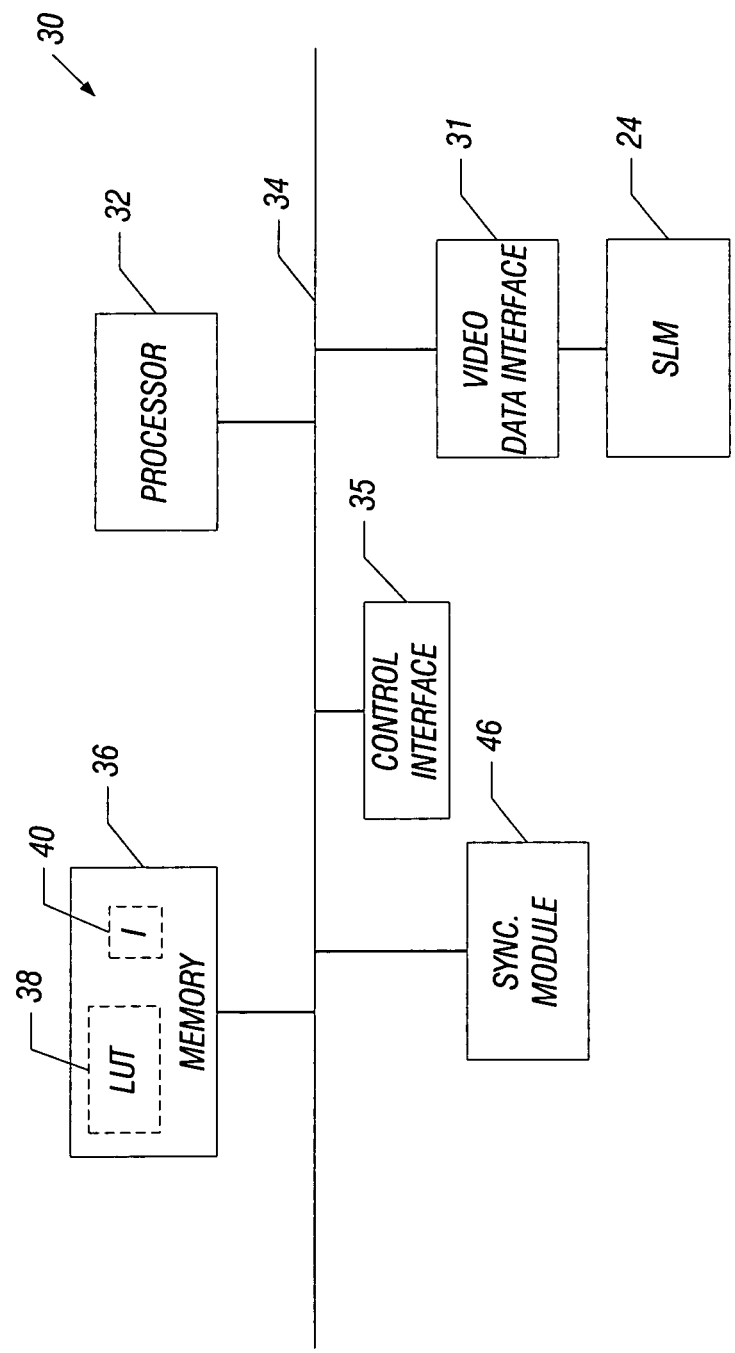
FIG. 3 is a block diagram of an electrical system of the projection display system according to an embodiment of the invention.

In some embodiments of the invention, an electrical system 30 for the projection display system 10 (FIG. 1) may have a general structure that is depicted in FIG. 3. Referring to FIG. 3, the electrical system 30 may include a processor 32 (one or more microcontrollers or microprocessors, as examples) that is coupled to a system bus 34. The processor 32 communicates over the system bus 34 with a memory 36 (a flash memory, for example) of the electrical system 30. The memory 36 stores instructions 40 to cause the processor 32 to perform one or more of the techniques that are described herein, as well as a look-up table (LUT) 38.

In some embodiments of the invention, the projection display system 10 (FIG. 1) operates the pixel cells of the SLM 24 in a digital fashion, in that each pixel cell at any one time is either in a reflective state or a non-reflective state. Gray scale intensities are achieved by pulse width modulation (PWM), a modulation technique that controls the optical behavior of the pixel cell during an interval of time called a PWM cycle to control the intensity of the corresponding pixel of the projected image. The PWM control regulates the amount of time that a particular pixel cell is in its reflective and non-reflective states during a PWM cycle for purposes of establishing a certain pixel intensity. The amount of time that the pixel cell is in each reflectivity state for a given pixel intensity value is established by the LUT 38, in some embodiments of the invention. It is noted that in some embodiments of the invention, the LUT 38 may represent a collection of LUTs, one for each primary color. For purposes of simplifying the discussion herein, only one LUT is assumed, unless otherwise stated. The LUT 38 indicates a PWM duty cycle for each potential pixel intensity value.

Among its other features, the electrical system 30 may include a synchronization module 46 and a video data interface 31 that are coupled to the system bus 34. The synchronization module 46 can assist in synchronizing the position of the drive signal of the single pixel analog light modulator 18 with the start of a PWM timing cycle. The video data interface 31 receives pixel intensity data that is mapped through LUT 38 to specify per pixel PWM data (to drive the SLM 24).

In some embodiments of the invention, the LUT 38 includes a corresponding duty cycle entry for each unique pixel intensity value. The duty cycle entry indicates a duration that the pixel cell remains in its default reflective state during the PWM cycle to produce the desired pixel intensity. The pixel cell remains in the non-default reflective state during the remainder of the PWM cycle. In some embodiments of the invention, each table entry indicates a number of pulse width modulation (PWM) counts, or clock cycles, for each intensity value. These are the number of clock cycles that the pixel cell needs to remain in its default reflective state. For the remaining clock cycles of the PWM cycle (having a fixed duration, for example), the pixel cell is in its non-default reflective state. The PWM clock counts may be executed with the non-reflective portion first and the reflective portion second or with the reflective portion first and the non-reflective portion second. In other embodiments, fractions of the total reflective and non-reflective clock counts may be alternated during a PWM cycle. In any execution strategy, the LUT-prescribed time proportion remains consistent relative to the whole PWM cycle time.

Figure 4:
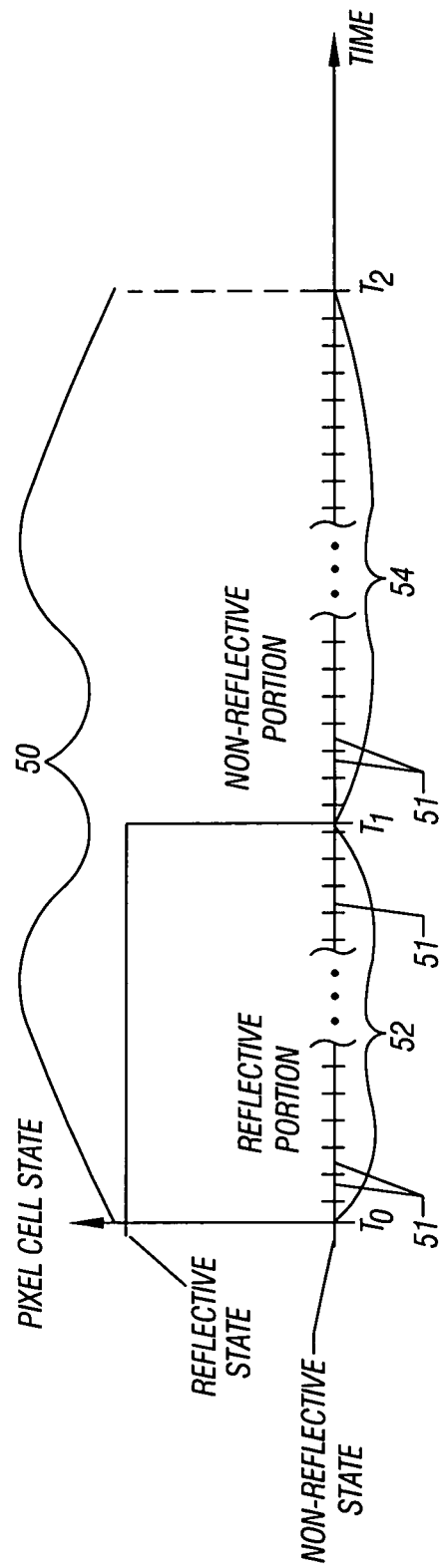
FIG. 4 is an illustration of a pulse width modulation control technique for a pixel cell according to an embodiment of the invention.

Referring to FIG. 3 in conjunction with FIG. 4, the processor 32, for a given video data value, retrieves the corresponding PWM count from the LUT 38. The retrieved value, in turn, determines the number of PWM clock counts that, in turn, govern the duration of a reflective portion 52 of a PWM cycle 50. The remaining counts form a non-reflective portion 54 (i.e., the remaining portion) of the PWM cycle 50. Stated differently, the PWM cycle 50 may be viewed as being formed from consecutive and non-overlapping time segments 51, each of which has the duration of a specified number of clock cycles. In some embodiments of the invention, the pixel cell, at the beginning of the PWM cycle 50, is in the non-reflective state. The number of PWM counts determine the number (if any) of time segments 51 from time $T_0$ until time $T_1$ (at the end of the reflective portion 52 of the PWM cycle 50) in which the pixel cell remains in the reflective state. At the conclusion (time $T_1$) of the reflective portion 52, the pixel cell transitions to its non-reflective state (to begin the non-reflective portion 54) until the end of the PWM cycle 50 at time $T_2$.

The duration of the PWM cycle 50 depends on the configuration of the projection display system. For the single liquid crystal SLM panel-configuration of the projection display system 10 (FIG. 1), the PWM cycle frequency is equal to a multiple of the field frequency (60 Hz). The multiple may be set as desired to mitigate color breakup, a visual artifact associated with temporal color sequential displays. PWM cycle frequencies may be at 240 Hz, 360 Hz, and so on. Each pair of PWM cycles is dedicated to an illumination color primary (red or green or blue). One PWM cycle asserts a first voltage polarity and the second PWM cycle asserts the opposite voltage polarity while driving the pixel cell to establish the pixel intensity (such as the PWM cycle 50). More specifically, the second PWM cycle should assert the bright state for the same duty cycle duration as the first PWM cycle, except that the voltage field across the liquid crystal material is reversed in polarity. Additionally, the reflectivity state sequence in the second PWM cycle may proceed in the reverse time order of the driving PWM cycle.

Using the retrieved value from the LUT 38, the processor 32, in accordance with some embodiments of the invention, utilizes the corresponding PWM count to time the duration of the PWM cycle for the respective pixel by means of the video data interface 31 (FIG. 3).

Figure 5:
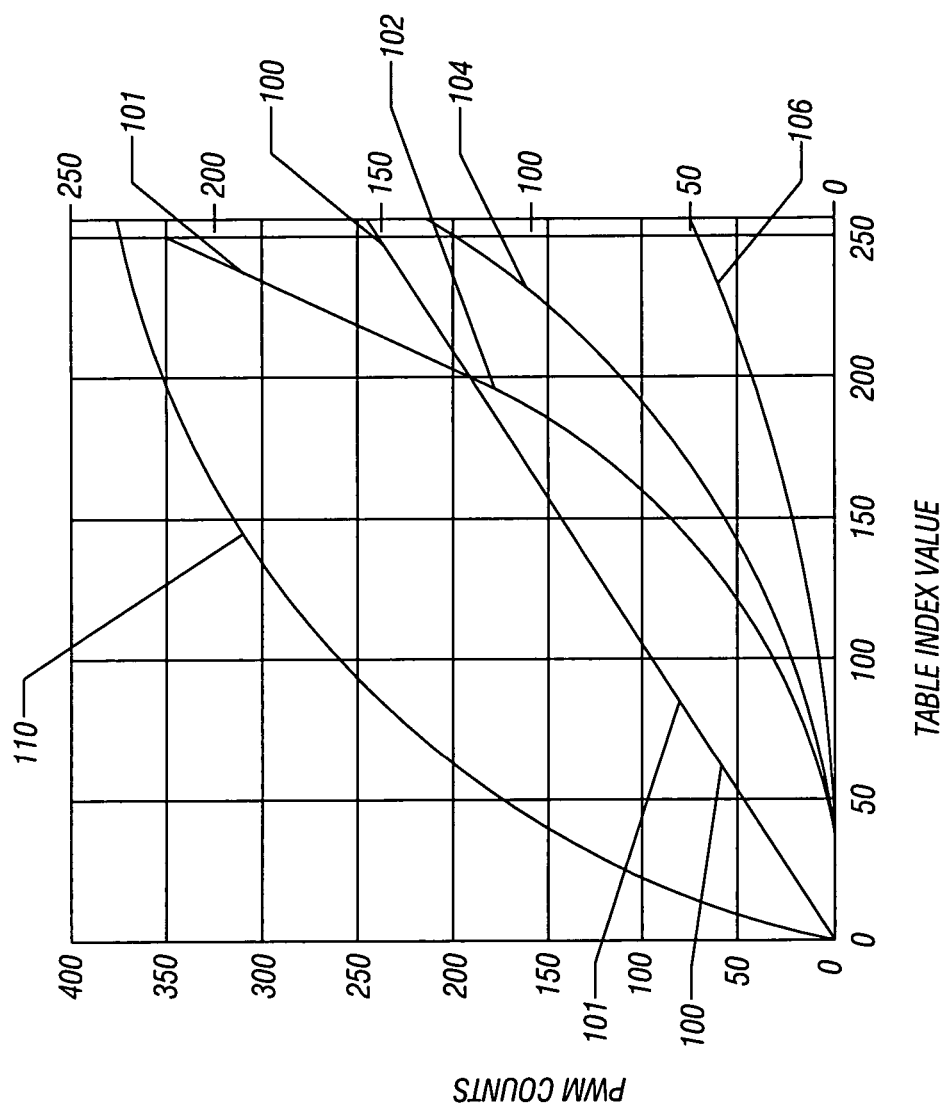
FIG. 5 depicts relationships between pixel intensities and a table index value.

Referring to FIG. 5, in some embodiments of the invention, the entries of the LUT 38 (FIG. 3) establish a relationship between the PWM counts and the received video data values (represented by "table index values" in FIG. 5). For example, the LUT 38 establishes, in conjunction with other features of the display projection system 10 described below, relationships between the video data values and the pixel intensities that appear in the projected image. However, the video data that is furnished to the projection display system 10 may not have a linear relationship to the pixel intensities that are required for the projected image because the video data may be pre-compensated to drive a non-linear cathode ray tube (CRT) display, for example.

More specifically, the video data that is furnished to the projection display system 10 (FIG. 1) may be pre-compensated to accommodate the non-linear responses of phosphors of a CRT display. Thus, a conventional CRT display receives the pre-compensated video data and directly drives the CRT tube with this data. However, for a SLM display system, such as the projection display system 10, the pre-compensation must be removed from the video data. Therefore, the relationship between the video data and the PWM counts should not be linear, but rather, should be non-linear in a manner that removes the CRT pre-compensation and applies gamma compensation appropriate for the SLM in the projection system. The correct gamma compensation required will depend on the voltage to reflectance transfer characteristics of the SLM as well as the application. For office displays, it is common to drive to a final optical gamma of 2.2, while for home theater, it is more common to drive to a final optical gamma of 2.5.

More specifically, still referring to FIG. 5, system 10 should establish a non-linear relationship between the video data that is furnished to the system 10 and the PWM clock counts. A curve 106, for example, represents the needed relationship imposed by the LUT 38 between the blue component video data and the blue SLM PWM count; a curve 104 represents the needed relationship between the green component video data and the green SLM PWM count; and a curve 102 represents the needed relationship between the red component video data and the red SLM PWM count.

As can be seen from FIG. 5, for the darker video levels (i.e., the smaller table index values), the compensated PWM count increases at a slower rate than for the brighter pixel intensity values (i.e., the larger table index values). The PWM clock count resolution (and thus, the video grayscale resolution, as appears in the projected image), is determined by the minimum PWM cycle clock duration that is required to form intensity changes that are small enough to be below the visual contouring threshold for the darkest tones. Because the PWM clock resolution also establishes the duration of the time segment 51 (see FIG. 4), the smaller the duration of the time size 51, the higher the frequency of the needed clock frequency. This may present challenges, in that a high clock frequency means a higher power consumption.

Therefore, in accordance with embodiments of the invention, an illumination modulation technique is used to establish multiple, in this example two pixel grayscale resolution levels from a single clock frequency: a first, higher resolution for the darker pixel intensities values; and a second, lower resolution for the brighter pixel intensities. As described below, as a result of the illumination modulation, the duration of the time segment 51 may be established based on the lower resolution and not on the higher resolution, thereby reducing the clock frequency and effectively increasing the bit depth of the PWM modulation. This modulation may be effected by the single pixel analog modulator 18.

Figure 6:
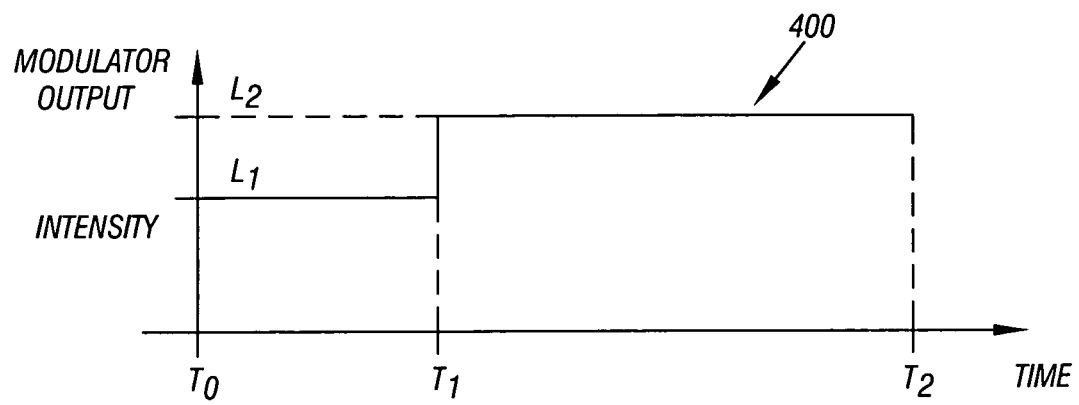
FIGS. 6 and 7 depict modulator output intensity profiles of the projection display system during a pulse width modulation cycle according to different embodiments of the invention.

Referring to FIG. 1 in conjunction with FIG. 6, more specifically, in some embodiments of the invention, the output light intensity may be controlled by the single pixel analog modulator 18 pursuant to a time-varying profile 400. During time $T_0$ to time $T_1$, the projection display system 10 establishes a first, lower intensity output level (called "$L_1$") to effectively reduce the illuminance contribution during the PWM time segments during time $T_0$ to time $T_1$. At time $T_1$, the analog modulator 18 modulates its output light intensity to increase the intensity output level to a higher intensity level $L_2$ until the PWM cycle ends at time $T_2$. Thus, from time $T_1$ to time $T_2$, each time segment of the PWM cycle contributes an increased luminance value, as compared to the luminance values contributed during the time $T_0$ to time $T_1$ time interval. Therefore, by modulating the output intensity in this fashion, a higher resolution is created for darker pixel intensities, and a lower resolution is created for the brighter pixel intensities.

Figure 8:
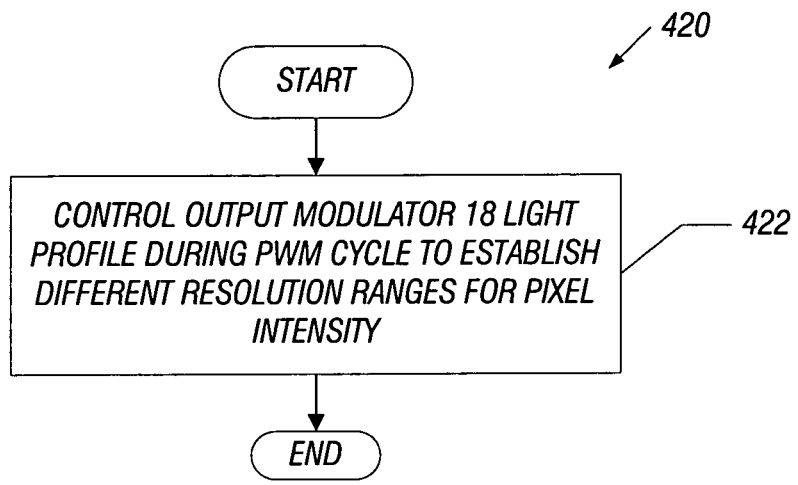
FIG. 8 is a flow diagram depicting a technique to control the modulator to establish different pixel intensity resolutions according to an embodiment of the invention.

In some embodiments of the invention, the modulator 18 may be controlled by the processor 32 (see FIG. 1). In particular, in some embodiments of the invention, the processor 32 may execute the instructions 40 (FIG. 1) that are stored in the memory 36 to cause the processor to perform a technique 420 that is generally depicted in FIG. 8. Referring also to FIG. 8, pursuant to the technique 420, the processor 32 controls (block 422) the modulator 18 so that the light from the modulator 18 has a time-varying output intensity profile during a PWM cycle to establish different tonal resolution ranges for the pixel intensity. Thus, in some embodiments of the invention, the processor 32, in response to execution of the instructions 40, writes the appropriate data to the module 46 (that is coupled to the system bus 34, as depicted in FIG. 1) at the appropriate times to control the time-varying output intensity profile of the output light.

Figure 7:
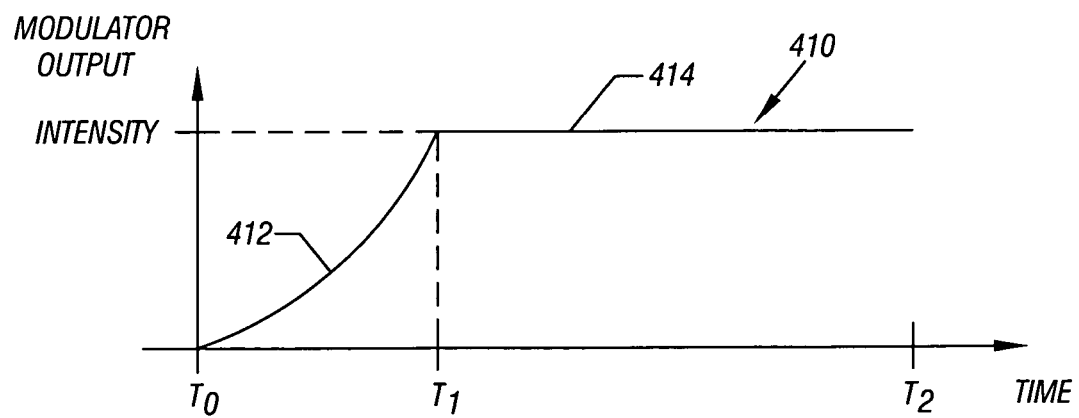

It is noted that the step profile of FIG. 6 is not the only intensity profile that may be used. For example, referring to FIG. 1 in conjunction with FIG. 7, in some embodiments of the invention, the processor 32 may control the modulator 18 via a time-varying intensity profile 410, a profile that includes a non-linear segment 412 from time $T_0$ until time $T_1$. As shown in FIG. 7, from time $T_1$ to time $T_2$, in some embodiments of the invention, the processor 32 may control the modulator 18 so that its output light has a general constant output intensity level 414 during this time interval. Other variations and other time-varying profiles are possible in other embodiments of the invention.

The above-described embodiments modulate the illumination source light output for purposes of establishing different pixel intensity resolutions and thus, effectively increasing the bit depth of the PWM modulation. However, in other embodiments of the invention, the illumination falling on the SLM(s) may be adjusted for purposes of improving the perceived contrast of the projected image.

More specifically, the human visual system has a tremendous range. When confronted with a dark image under dark ambient lighting conditions, various physiological effects come into play to improve the visual sensitivity. Unfortunately, this may lead to an undesirable situation in which low levels of light no longer appear black. At other times, when the ambient level of light in the room is high or when the content of the image has sufficient bright area, the sensitivity of the human visual system is reduced, and the low levels of light cannot be perceived. Therefore, in accordance with embodiments of the invention, the ambient lighting condition and the estimated human visual response are used to control the intensity of the lamp 12 for purposes of improving the perceived contrast of the projected image.

Figure 9:
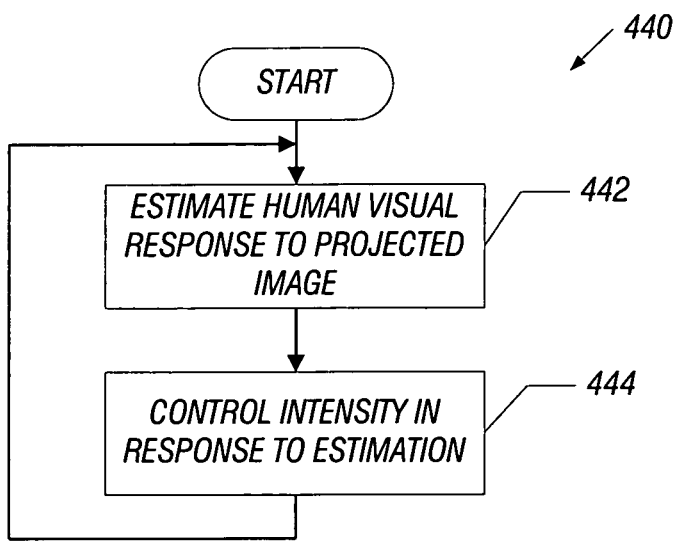
FIGS. 9 and 10 are flow diagrams depicting techniques to control a perceived contrast of a projected image according to different embodiments of the invention.

Referring to FIG. 9, in some embodiments of the invention, a technique 440 may be used to improve the perceived contrast of the projected image. Pursuant to the technique 440, the projection display system estimates (block 442) the human visual response to the projected image. This estimation may be in the form of a mathematical model that takes into account the human visual response model, such as the physiological changes occurring in the iris, retina and the overall perception by the eye to the projected image. The estimation 442 may also take into account, for example, the ambient lighting conditions.

Figure 10:
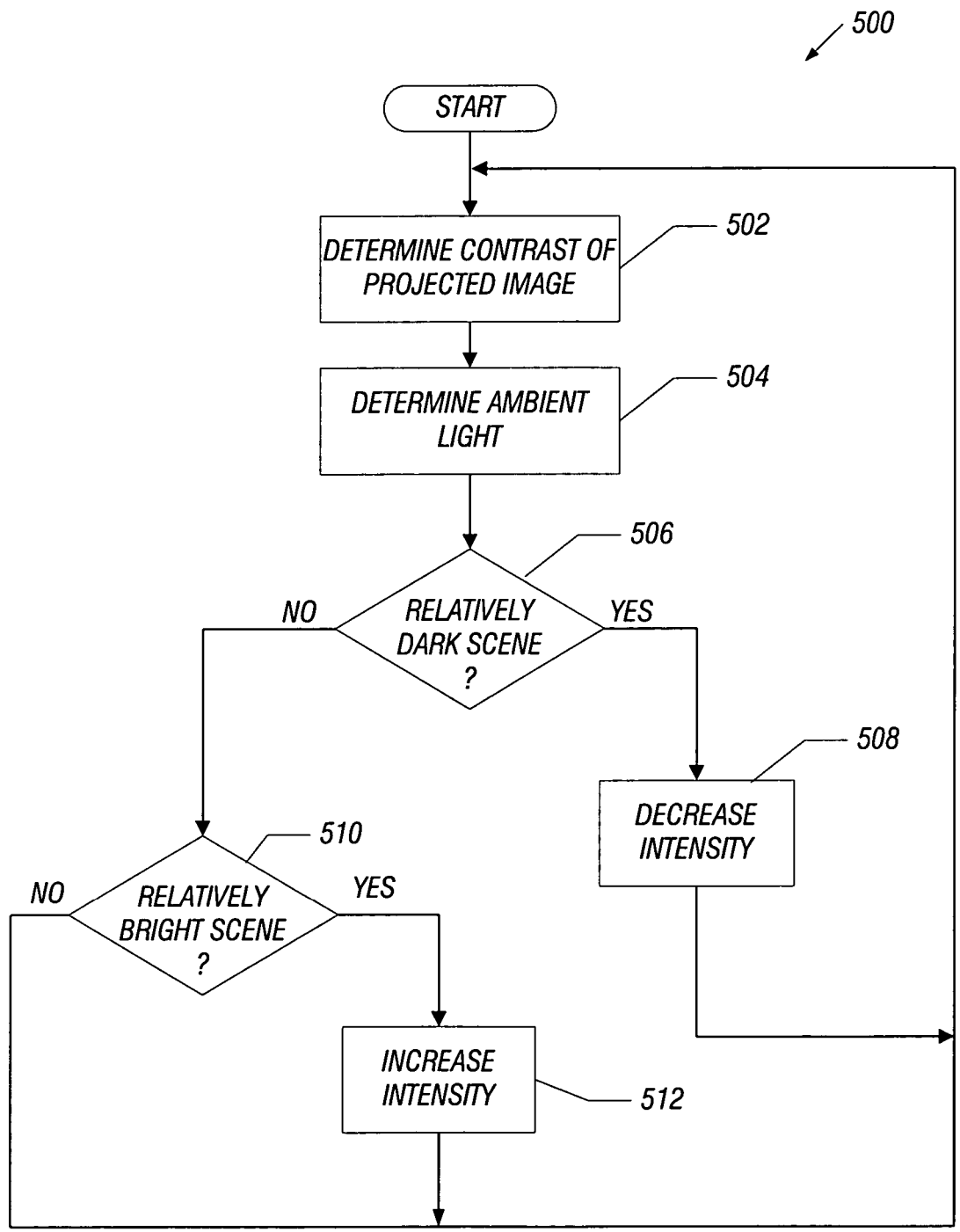

As a more specific example, FIG. 10 depicts a technique 500 that may be used by the projection display system 10 (FIG. 1) to improve the contrast of the projected image. Referring to FIG. 1 in conjunction with FIG. 10, pursuant to the technique 500, the processor 32 determines (block 502) the contrast and mean brightness of the projected image. This contrast determination may be made, for example, by comparing the brightest intensities of the image to the darkest intensities of the image. Next, pursuant to the technique 500, the processor 32 determines (block 504) the ambient lighting conditions. Therefore, in some embodiments of the invention, the projection display system (FIG. 1) may include a light sensor (not depicted in FIG. 1) for purposes of measuring the ambient lighting conditions.

Next, according to the technique 500, the processor 32 determines (diamond 506) whether the projected image is a relatively dark scene. This determination is made based on an analysis of the supplied video data values, such as the mean brightness calculated earlier. If the determination 506 concludes that the scene is relatively dark and the ambient environment is also dark, then the processor 32 decreases (block 508) the intensity from the modulator 18. For example, the processor 32 may write to the module 46 (FIG. 3) to decrease the intensity output level of the light. It is noted that the decrease (or increase) associated with the modulator 18 are relative increases and decreases, in that the light modulation discussed above in connection with increasing the bit depth of the PWM cycles may still be used, although the relative low and high intensity levels of the output of the modulator are decreased pursuant to block 508.

If the processor 32 determines (diamond 506) that the scene is not relatively dark, then the processor 32 determines (diamond 510) whether the scene is relatively bright. If the scene is relatively bright and the ambient environment is also bright, then the processor 32 increases (block 512) the light intensity.

It is noted that the technique 500 may be performed in a continual loop to constantly monitor the contrast and average tonality or "key" of the projected image and ambient lighting conditions, in some embodiments of the invention. Furthermore, in some embodiments of the invention, the processor 32 may execute the instructions 36 for purposes of causing the processor 32 to perform the technique 500.

Figure 11:
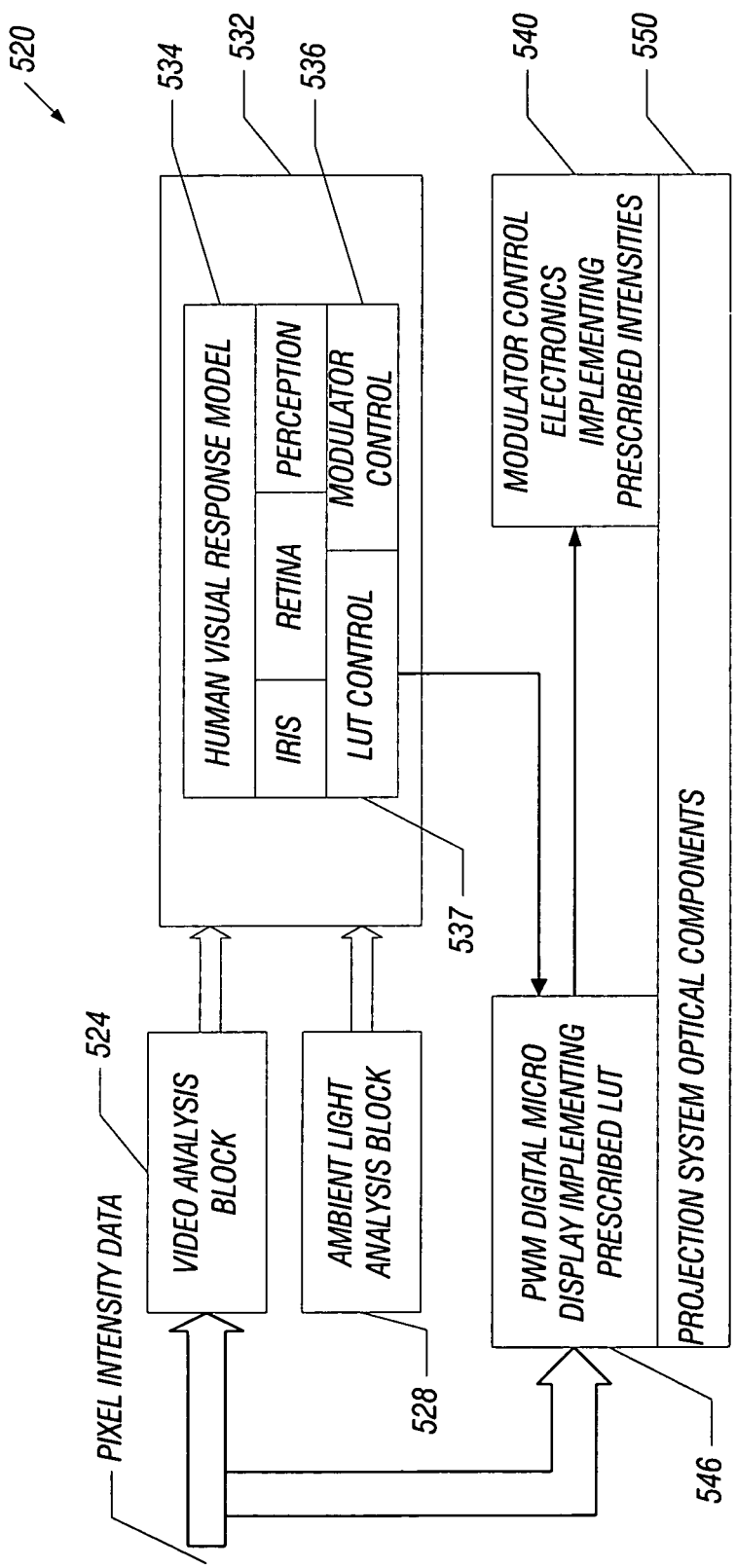
FIG. 11 is a block diagram of a projection display system according to another embodiment of the invention.

In some embodiments of the invention, a projection display system 520 that performs the above-described contrast optimization of the projected image may have the general structure that is depicted in FIG. 11. In this manner, the projection display system 520 may include a video analysis block 524 to perform an analysis of the contrast and mean brightness of the projected image. The projection display system 520 also includes an ambient light analysis block 528 for purposes of determining the ambient lighting in the environment where the projected image appears. The projection display system 520 may also include estimator 532 to use a human visual response model 534 to analyze such factors as iris reaction, retina behavior and the perceived contrast of the projected image. The estimator 532 may also include look-up-table (LUT) control 537 and modulator control 536 control blocks for purposes of determining the values to retrieve from the corresponding PWM LUT for purposes of determining the intensity level. Furthermore, the projection display system 520 may include a modulator controller 540 to control the intensity in response to the estimation of the human visual response from the estimator 532, a PWM digital micro display 546 (i.e., a SLM) and projection system optical components 520.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
    producing an illuminating beam for a projection display; and
    modulating the illuminating beam to create a higher resolution for first pixel intensity values and a lower resolution for second pixel intensity values, wherein said second pixel intensity values are higher than said first pixel intensity values.

2. The method of claim 1 including pulse width modulating an illuminating beam of a light to establish a pixel intensity.

3. The method of claim 1 including modulating the illuminating beam using an analog modulator.

4. The method of claim 3 including modulating using a liquid crystal device.

5. The method of claim 3 including using an exponential pulse to drive said analog modulator.

6. The method of claim 5 including synchronizing said pulse to a field rate.

7. The method of claim 1, wherein a modulation period comprises a number of modulation counts and the act of modulating comprises:
    establishing a first tonal resolution for a first range of modulation counts; and
    establishing a second tonal resolution different than the first tonal resolution for a second range of modulation counts to produce an effective tonal bit depth exceeding that based solely on the number of modulation counts.

8. The method of claim 7, further comprising:
    using the modulation to apply a gamma transfer function to pixel intensity data.

9. The method of claim 1, wherein the act of modulating the illuminating beam comprises:
    progressively increasing an intensity of the illuminating beam from the beginning of a time interval in which the pulse width modulating occurs.

10. The method of claim 1 wherein the act of modulating the illuminating beam comprises:
    forming one intensity of the illuminating beam at the beginning of a time interval in which the pulse width modulating occurs and forming a second intensity of the illuminating beam at a later point in the time interval.

11. An apparatus comprising:
    a spatial light modulator to modulate a beam of light to establish a pixel intensity;
    a lamp to produce said beam of light; and
    a single pixel analog modulator between said lamp and said spatial light modulator to modulate the beam to create a higher resolution for first pixel intensity values and a lower resolution for second pixel intensity values, wherein said second pixel intensity values are higher than said first pixel intensity values.

12. The apparatus of claim 11 including a device to synchronize the field rate of said spatial light modulator to said analog modulator.

13. The apparatus of claim 12 wherein said analog modulator is driven by an exponential pulse.

14. The apparatus of claim 11 wherein said analog modulator is a liquid crystal device.

15. The apparatus of claim 11 wherein said spatial light modulator is a pulse width modulation spatial light modulator.

16. The apparatus of claim 11 including a device to apply a gamma transfer function to pixel intensity data.

17. The apparatus of claim 16 including a polarizing beam splitter between said analog modulator and said spatial light modulator.

18. The apparatus of claim 17 wherein said spatial light modulator is a liquid crystal-on-silicon spatial light modulator.

19. The apparatus of claim 11 wherein said apparatus is a rear projection display.

20. The apparatus of claim 11 wherein said apparatus increases the intensity of the illumination beam to said spatial light modulator from the beginning of a time interval in which the pulse width modulating occurs.

21. A rear projection display comprising:
    a lamp to produce a beam of light;
    a single pixel analog modulator to modulate said beam of light to create a higher resolution for first pixel intensity values and a lower resolution for second pixel intensity values, wherein said second pixel intensity values are higher than said first pixel intensity values;
    a polarization beam splitter coupled to receive the output from said modulator; and
    a spatial light modulator.

22. The display of claim 21 including a device to synchronize the field rate of said spatial light modulator to said analog modulator.

23. The display of claim 22 wherein said analog modulator is driven by an exponential pulse.

24. The display of claim 21 wherein said analog modulator is a liquid crystal device.

25. The display of claim 21 wherein said spatial light modulator is a pulse width modulation spatial light modulator.

26. The display of claim 21 including a device to apply a gamma transfer function to pixel intensity data.

27. The display of claim 26 including a polarizing beam splitter between said analog modulator and said spatial light modulator.

28. The display of claim 27 wherein said spatial light modulator is a liquid crystal-on-silicon spatial light modulator.

29. The display of claim 21 wherein said modulator to adjust for ambient light conditions.

30. The display of claim 21 wherein said modulator to adjust for human visual response.

\* \* \* \* \*